United States Patent [19]

Cobb et al.

[11] Patent Number: 4,544,169
[45] Date of Patent: Oct. 1, 1985

[54] MANUFACTURED PRECOMPRESSED GASKET ASSEMBLY WITH EMBEDDED WIRE RING AND LOCALLY DENSIFIED SHEET MEMBERS

[75] Inventors: David A. Cobb, Hazelcrest; Frank L. Miszczak, Frankfort, both of Ill.

[73] Assignee: Felt Products Mfg. Co., Skokie, Ill.

[21] Appl. No.: 622,719

[22] Filed: Jun. 20, 1984

[51] Int. Cl.$^4$ .................... F16J 15/08; B65D 53/00
[52] U.S. Cl. .......................... 277/235 B; 277/180; 277/236
[58] Field of Search .................. 277/180, 234, 235 R, 277/235 A, 235 B, 236

[56] References Cited

U.S. PATENT DOCUMENTS

| | | | |
|---|---|---|---|
| 368,189 | 8/1887 | Carter | 277/180 X |
| 1,819,694 | 8/1931 | Sperry | 277/235 B |
| 1,847,729 | 3/1932 | Shaw | 277/235 B X |
| 2,553,222 | 5/1951 | Wallgren et al. | 277/236 X |
| 3,467,398 | 9/1969 | Bernard | 277/180 |
| 3,473,813 | 10/1969 | Meyers et al. | 277/180 |
| 4,335,890 | 6/1982 | Nicholson | 277/235 B |

FOREIGN PATENT DOCUMENTS

511027  8/1939  United Kingdom ............ 277/235 B

*Primary Examiner*—Robert S. Ward
*Attorney, Agent, or Firm*—Dressler, Goldsmith, Shore, Sutker & Milnamow, Ltd.

[57] ABSTRACT

A high temperature resistant gasket assembly comprises a metallic sheet member defining a plurality of openings, including at least two bolt holes through which bolts are adapted to pass and at least one high pressure opening for surrounding a high pressure zone to be sealed. The metallic sheet member defines a surface zone adjacent the high pressure opening. A metallic wire is disposed on a surface zone of the metallic sheet member closely adjacent to the high pressure opening to effect a seal at the surface zone. Preferably, the metallic sheet is of a low carbon steel and the wire is a copper wire. A second metallic sheet member of substantially the same shape, form and material as the metallic sheet member may be positioned to overlie the metallic wire, and to confront the first sheet member to form a sandwich with the wire between the sheet members. The second sheet member has a second surface zone complementary to the first surface zone. The gasket assembly may be precompressed so that the wire is significantly embedded into each surface zone to provide a sealing zone of high sealing stress adjacent the high pressure opening. The metallic wire may be shaped to surround the high pressure opening.

6 Claims, 8 Drawing Figures

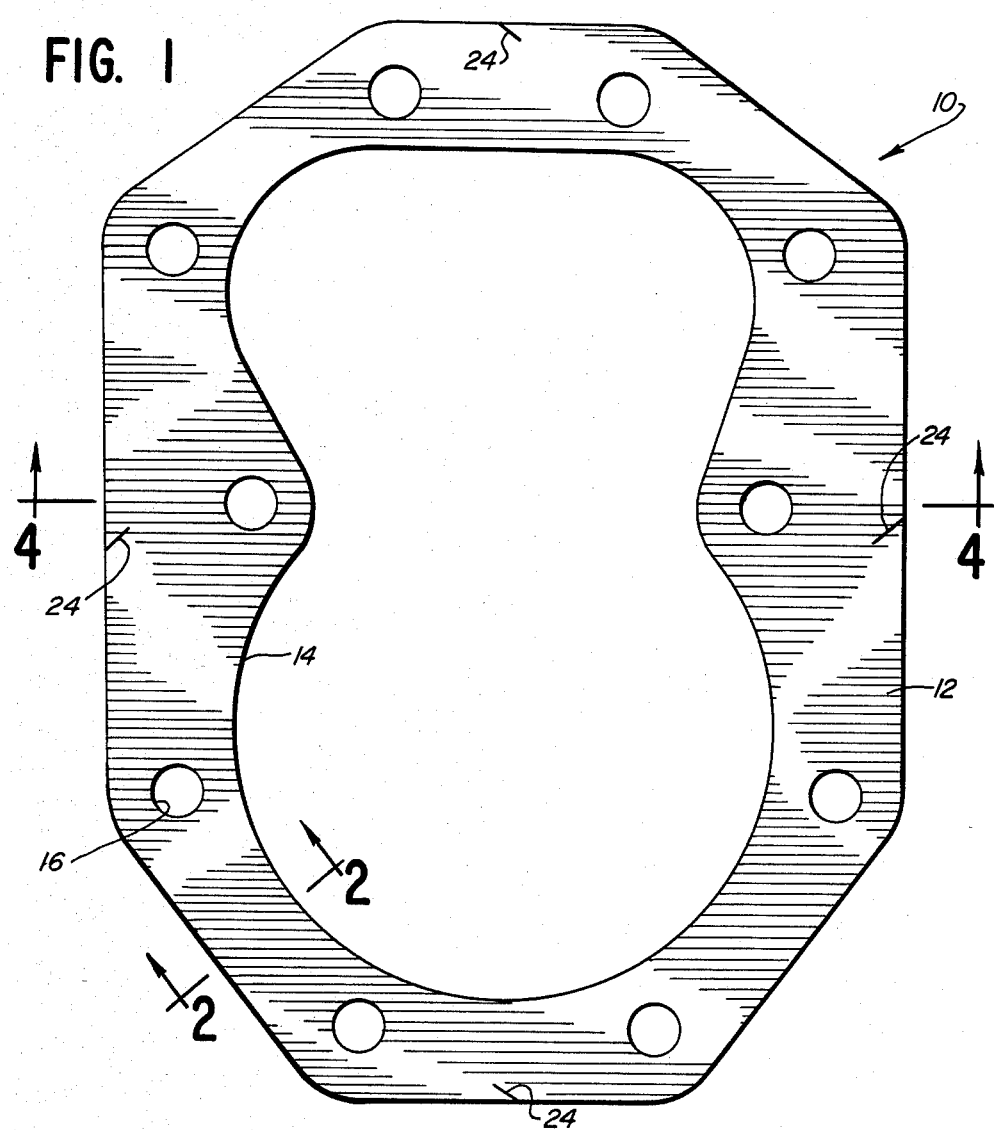
FIG. 1
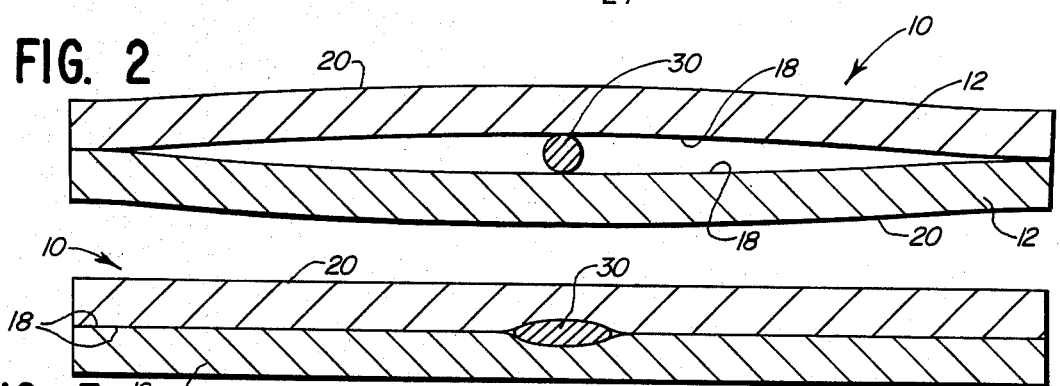
FIG. 2
FIG. 3
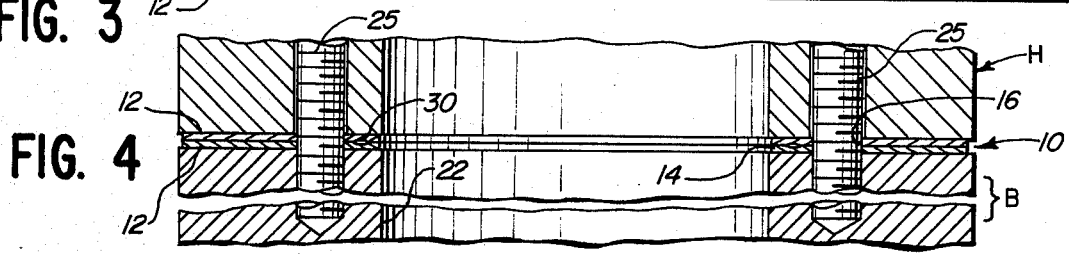
FIG. 4

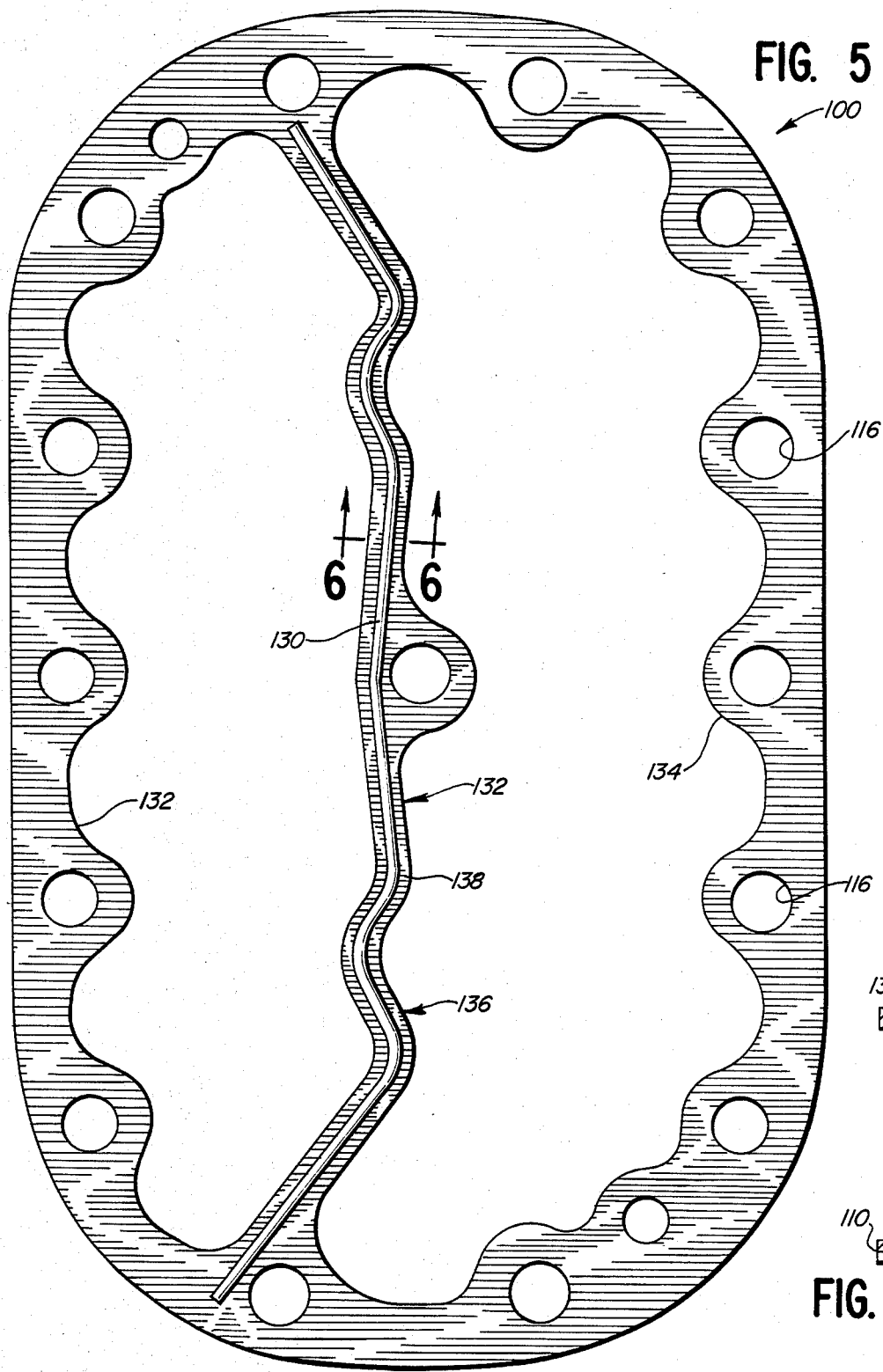
FIG. 5
FIG. 6
FIG. 7
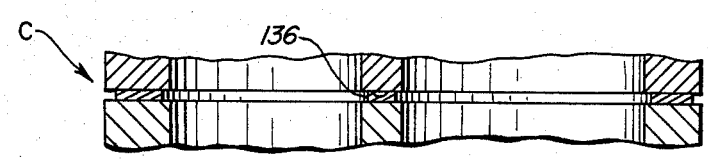
FIG. 8

MANUFACTURED PRECOMPRESSED GASKET ASSEMBLY WITH EMBEDDED WIRE RING AND LOCALLY DENSIFIED SHEET MEMBERS

BACKGROUND OF THE INVENTION

A wide variety of approaches to sealing in moderately high pressure and high-temperature environments, such as in internal combustion engines, have been used. Each has its advantages and drawbacks.

For example, in small one and two cylinder air-cooled internal combustion engines, such as those used as engines for lawn tractors and the like, compressed asbestos head gaskets have been used. These have not been entirely satisfactory, particularly where one of the engine components, such as the head, has been of aluminum. And in refrigerant compressors, the gaskets used have not always effectively sealed in certain zones, such as at cross-ribs or webs in the gasket assembly. Not only have such gaskets not been as effective as they might be, but the elevated temperature environments in which they are used have made it difficult to embrace many approaches to improving their sealing effectiveness which might have been used at lower temperatures. For example, the use of elastomeric or even silicone sealing beads is simply not feasible in head gaskets for many air-cooled engines where the temperature reaches and stays at 400° F. or more.

A multitude of factors must be taken into consideration in producing an effective seal. Such factors include, among others, temperature, pressure, surface irregularities in the surfaces to be sealed, unequal torque loads on the bolts, limited available torque load, bowing of the members to be sealed and the inability to place bolts in all of those locations which would assure adequate distribution of the loading forces. Additionally, stress relaxation of many gasket materials, manufacturing tolerances and other factors inherant in the manufactured seals and gaskets themselves contribute to the difficulty of effective sealing, particularly in high temperature environments. Further, the use of a metallic gasket facilitates effective heat transfer which is especially important for air-cooled engines.

SUMMARY OF THE INVENTION

In accordance with the present invention, an improved gasket assembly for use at high temperatures is provided in which a thin, relatively soft metal wire is juxtaposed with and against an expansive metallic gasket surface and along or around a zone of the gasket surface which requires an improved seal. Surprisingly, even when the metallic gasket is steel and the wire is copper, when the gasket assembly is compressed and positioned between surfaces to be sealed, the wire becomes embedded in the surface of the metallic gasket. The zone of embedment provides a zone of high unit stress, as around a combustion opening of a head gasket, thereby greatly enhancing the sealing characteristics of the gasket assembly, and substantially reducing re-torque requirements which tend to be characteristic of gaskets such as compressed asbestos gaskets.

More particularly, a gasket assembly of the present invention comprises a metallic sheet member defining a plurality of openings, the openings comprising at least two bolt holes through which bolts are adapted to pass and at least one high pressure opening for surrounding a high pressure zone to be sealed. The metallic sheet member defines a surface zone adjacent the high pressure opening. A metallic wire is disposed on a surface zone of the metallic sheet member closely adjacent to the high pressure opening to effect a seal at the surface zone. Preferably, the metallic sheet member is of a low carbon steel and the wire is a copper wire.

A second metallic sheet member of substantially the same shape, form and material as the metallic sheet member may be positioned to overlie the metallic wire, and to confront the first sheet member to form a sandwich with the wire between the sheet members. The second sheet member has a second surface zone complementary to the first surface zone. Suitable connector means for securing the wire and sheet members together are provided.

The gasket assembly may be precompressed so that the wire is significantly embedded into each surface zone to provide a sealing zone of high sealing stress adjacent the high pressure opening. In one preferred form the metallic wire is shaped to surround and does surround the high pressure opening.

Further objects, features, characteristics and advantages of this invention will become apparent from the following description and drawings of presently preferred embodiments of the present invention.

BRIEF DESCRIPTION OF THE DRAWINGS

FIG. 1 is a plan view of a head gasket assembly made in accordance with the principles of the present invention;

FIG. 2 is a cross-sectional view of the uncompressed head gasket assembly of FIG. 1, taken substantially along line 2—2 of FIG. 1;

FIG. 3 is a view similar to that of FIG. 2, with the head gasket assembly in a compressed condition;

FIG. 4 is a schematic view of an engine assembly, with the gasket assembly of FIG. 1 installed therein;

FIG. 5 is a plan view of a refrigerant compressor gasket assembly in accordance with a further embodiment of the present invention;

FIG. 6 is a cross-sectional view of the uncompressed gasket assembly of FIG. 5, taken substantially along line 6—6 of FIG. 5;

FIG. 7 is a view similar to that of FIG. 6 with the gasket assembly in a compressed condition; and FIG. 8 is a schematic view of a refrigerant compressor with the gasket assembly of FIG. 7 installed therein.

DETAILED DESCRIPTION OF THE ILLUSTRATIVE EMBODIMENTS

Referring now to the drawings, FIGS. 1 to 4 illustrate a first embodiment of the present invention. FIG. 1 shows an uncompressed head gasket assembly 10 prior to installation. Gasket assembly 10 comprises a pair of low carbon steel metallic sheets 12. Each sheet 12 defines a plurality of openings or apertures, including at least one high pressure opening such as combustion opening 14, and at least two bolt holes, such as the plurality of bolt holes 16. Each sheet 12 comprises an inner surface 18 and an outer surface 20. The outer surfaces 20 are adapted to bear against the surfaces of an engine block B and head H, as generally illustrated in FIG. 4.

Of course, as is customary, it is imperative that an effective seal be provided around the combustion opening 14 in the gasket, thereby to prevent the escape of combustion gases from the engine combustion chamber 22 and to maintain the desired compression ratio. To that end, in accordance with the present invention, a thin metallic wire 30, such as a thin copper wire, is disposed between the sheets 12 to form a sandwich therewith and in a combustion opening encircling disposition. The wire 30 is positioned in a sheet zone which is closely adjacent to the edge of the combustion opening.

The wire may be temporarily secured to one or both sheets by brazing, spot welding or via an adhesive such as a cyanoacrylate adhesive. The sheets are preferably staked together at several outer peripheral locations 24 in a manner such that under compression, the staking does not produce any increased gasket thickness.

The thusly formed gasket assembly 10 is now ready for precompression or for direct use in an engine. When precompressed or installed, and when the engine bolts 25 are torqued to tightly compress the gasket against the faces of the head H and block B, the wire 30 not only compresses, but surprisingly also indents the metallic sheets of the gasket, thereby to partially embed the wire in the sheets. This is illustrated by the transition from the uncompressed manufactured condition of FIG. 2 to the compressed condition of FIG. 3. The compression and embedment produces a relatively high unit loading in the narrow surface zone immediately surrounding the combustion opening, and has been determined to produce a highly effective seal which appears to require no retorquing and which is not sensitive to the elevated temperatures normally encountered in air-cooled internal combustion engines.

Not only does the gasket assembly 10 produce a highly effective seal, but it was also found that there was no brinnelling of the head or block, a fact that is important in the event that overhaul of the engine is later necessary. Were there brinnelling, the indentation of the engine head or block would tend to promote combustion gas leakage upon reassembly with a new gasket.

A gasket was prepared by forming two low carbon steel sheets having the shape shown in FIG. 1, and with the combustion opening and bolt holes positioned as shown. Each gasket sheet was approximately 7" by 5¼" by 0.032" thick. A 0.025" diameter copper wire was positioned approximately ⅛" inwardly of the combustion opening on one sheet and was adhered thereto by a cyanoacrylate adhesive. The second sheet was placed over the wire and the first sheet. The sheets were then secured with tape in several spaced peripheral locations. The assembly was precompressed to a thickness of approximately 0.068 inch in the zone of the wire. The precompressed gasket assembly was then installed in an engine and each of the bolts were torqued to between 14 to 16 foot-pounds.

The engine was then run for fifty (50) hours and it was determined that an effective seal was obtained and maintained. The gasket was easily removed (it did not stick as many fibrous and elastomer containing gaskets will). The engine head and block surfaces were found to be free of any brinnelling. The gasket itself displayed an external surface pattern which evidenced some hardening of the gasket sheets in the zone of the wire. Inspection of the gasket assembly disclosed that the wire had been substantially flattened, and that the wire partially and significantly indented into the surface of each of the steel sheets.

The sealing characteristics of the wire embedded gasket assembly were excellent, and the torque retention characteristics were excellent. The gasket assembly was also found to be free of significant temperature sensitivity. Thus, gasket assembly 10 was found to be a highly effective sealing medium, and much improved over available prior art gaskets used for that air-cooled engine application.

Another gasket assembly 100 embodying the present invention and suitable for a refrigerant compressor application is shown in FIGS. 5-8. In this embodiment, a low carbon steel sheet 110 was formed as by punching, to provide a suitable plurality of openings including bolt holes 116 and apertures 132, 134, and a cross-rib or central web 136 serving as a divider for the apertures. Effective sealing against the confronting surfaces of the compressor assembly C (FIG. 8) across the gasket central web 136 has been difficult in the past to achieve.

In the present case, a thin copper wire 130 was disposed on the upper surface 138 of the divider web, as seen in FIGS. 5 and 6, and was temporarily secured thereto, as with a cyanoacrylate adhesive. The gasket assembly 100 was then positioned between confronting surfaces, and was compressed to a cross-sectional shape like that shown in FIG. 7. The compressed gasket assembly 100 was tested and was found to produce a highly effective seal which did not require retorquing.

A typical refrigerant compressor gasket was made of a low carbon steel sheet 0.015 inch thick. Its external dimensions were approximately 6 inches by 10 inches. The part was proportioned substantially as shown in FIG. 5. A 0.016 inch diameter copper wire was positioned as shown in FIG. 5 and as described along the web 136. Following compression of the refrigerant compressor gasket assembly, the gasket assembly was removed and examined. It was found that the sheet 110 had been indented to approximately 27% of its depth by the copper wire. It was further found by metallurgicial analysis the sheet steel granular structure had been substantially compressed in the zone directly underlying the wire and that the wire had been flattened and spread substantially to the shape shown in FIG. 7. The sealing characteristics of the gasket assembly were found to be excellent, and to be effective without adversely affecting the qualities of the mating surfaces against which the gasket assembly seals. The gasket assembly was found to withstand pressures of 1800 psi without leaking whereas other seals in the cross-web failed at 1200 psi or lower.

Tests have been made of certain physical characteristics of a gasket assembly 100 after compression. These have demonstrated that the wire not only indents the steel, but produces a zone of localized hardness showing the surprising ability of a relatively small, relatively soft wire to produce changes in the steel sheet or sheets and to significantly enhance the sealing qualities of the sheets and gasket assembly.

In one specimen in accordance with FIG. 5 and using a low carbon steel sheet 0.015 inch thick and a 0.016 inch OD copper wire, following compression to achieve a wire shape generally as illustrated in FIG. 7, microhardness was tested with a Wilson Tukon microhardness tester equipped with a Knoop diamond indentor and a 200 gram load. At points 0.0015" and 0.0045" directly below the surface at which the copper wire contacted the steel sheet, hardness was measured at 91.5 and 90.5 Rockwell "B", respectively. Away from the surface at which the wire contacted the steel sheet, and at depths of 0.0015" and 0.0045", Rockwell "B" hardness was measured at 74.5 and 72.5, respectively. It was also observed that the gasket had been indented about 27%, i.e., the steel sheet thickness at the center of the wire was about 73% of its original thickness.

It is thus clear that the steel sheet is hardened significantly in the zone of the wire and is worked to produce a zone in which the unit loading becomes somewhat higher when the gasket is torqued down, thereby to concentrate the sealing forces in a more limited zone, thusly enhancing the sealing effect of the steel sheet.

A gasket assembly otherwise identical to that just described, but using a copper wire with a 0.036 inch diameter (rather than 0.016 inch diameter) was indented approximately 35% after compression. At points 0.0015" and 0.0045" directly below the surface at which the copper wire contacted the steel sheet, Rockwell "B" hardness was measured at 92.5 and 91.5, respectively. Away from the surface at which the wire contacted the steel sheet, and at depths of 0.0015" and 0.0045", Rockwell "B" hardness was measured as 71.0 and 66.0, respectively.

Another specimen, this one comprising a steel plate 0.077 inch thick was provided with a SAE Grade 1010 low carbon steel wire 0.014 inch in diameter in one zone and a copper wire 0.016 inch in diameter in another zone. The assembly was compressed, and then disassembled. In this case, the granular structure of the steel plate under the wires were again found to have been compressed, and the wires to have become flattened and embedded, thereby producing zones which produced higher unit stresses than elsewhere. Again, this is characteristic of an assembly which has been found to produce highly effective sealing.

The following Rockwell "B" test results on the 0.077 inch steel gasket just described were obtained in the manner described above:

|  | Depth in Zone of the Wire | | Depth Remote From the Wire | |
| --- | --- | --- | --- | --- |
|  | 0.0015" | 0.0045" | 0.0015" | 0.0045" |
| 0.016" Copper Wire | 79.0 | 77.5 | 52.0 | 56.5 |
| 0.014" Steel Wire | 83.0 | 87.0 | 52.0 | 56.5 |

It was also observed that the steel plate was indented approximately 8% of its thickness by the copper wire and about 10% of its thickness by the steel wire.

From this data, it is clear that steel gaskets are substantially hardened in the zone of the wire, contributing to producing sealing zones of enhanced effectiveness, strength and enhanced unit loading.

Gaskets produced in accordance with the present invention provide a number of advantages. For example, in some environments, such as in air cooled internal combustion engines, dissipation of heat from the block is important to minimize bore and block distortion. When an insulator, such as asbestos or a like material, is used as the head gasket, the gasket will not permit heat to be conducted from the block and crankcase to the head. With a metallic gasket, block heat will be conducted to the head, helping to draw off heat and reduce the temperature of the block, thereby enhancing the life-expectancy of the block and crankcase.

Also, gaskets of the present invention display significantly less torque loss than do asbestos and like gaskets which continue to compress in use, thereby decreasing both their resiliency and thickness.

Importantly, the metallic gasket assemblies of the present invention are not heat sensitive, as are many gaskets. As gaskets employing elastomers and fibers dry out, or are otherwise affected by heat and pressure, the high pressure tends to drive a leak path through the seal. This results in blow-by and disablement of the device which was to be sealed. The metal gaskets of the present invention are not significantly affected by heat and pressure and thus are more likely to be long-lived than conventional gaskets. Furthermore, in environments such as air-cooled internal combustion engines, where temperatures reach as much as 400° F. or more, conventional elastomer and asbestos based materials are but marginally acceptable. The simple seal of this invention, which uses a small, relatively soft wire, such as a copper wire, a carbon steel wire or other suitable wire, is readily adapted to accommodate to such temperatures without adverse effect.

Finally, particularly when the wire of the present invention is disposed between a pair of metallic sheets, high unit loads may be obtained without potential brinnelling of a head or block. This is very important with engines in which aluminum heads are used in which prior gaskets have been designed carefully to avoid indentation of the head surface.

It will be apparent to those skilled in the art from the foregoing that further embodiments of this invention may be made without departing from the spirit and scope of the invention. Accordingly, the scope of the invention is to be considered as being limited only insofar as may be made necessary by the appended claims.

What is claimed is:

1. A manufactured high temperature resistant head gasket assembly especially adapted to accommodate to the relatively high temperatures of an air cooled internal combustion engine comprising a first metallic sheet member and a second metallic sheet member of substantially the same shape and form, each defining a plurality of openings, said openings comprising at least two bolt holes through which bolts are adapted to pass and at least one high pressure opening for surrounding a high pressure combustion zone to be sealed, said metallic sheet members each defining confronting surface zones adjacent said high pressure opening, and a metallic wire disposed and sandwiched between said surface zones closely adjacent to the high pressure opening, means securing said wire and sheet members together, and said gasket assembly during manufacture and prior to use being precompressed with said wire being significantly embedded into each said surface zone with said surface zones being densified and harder directly beneath the wire than the metallic sheets are dense and hard remote from the wire, whereby sealing zones of high sealing stress are provided adjacent said high pressure opening, thereby to provide an improved seal at said surface zones.

2. A gasket assembly in accordance with claim 1 wherein said metallic sheet members are low carbon steel.

3. A gasket assembly in accordance with claim 2 wherein said wire is a copper wire.

4. A gasket assembly in accordance with claim 3 wherein metallic wire is shaped to surround and does surround said high pressure opening.

5. A gasket assembly in accordance with claim 4 wherein said gasket assembly is precompressed, and said wire is significantly embedded into each said surface zone to provide sealing zones of high sealing stress surrounding said high pressure opening.

6. A gasket assembly in accordance with claim 1 wherein said wire is at least as soft as the metal of said metallic sheet members.

* * * * *